US005337946A

United States Patent [19]

Richardson et al.

[11] Patent Number: 5,337,946

[45] Date of Patent: Aug. 16, 1994

[54] SYSTEM FOR AFFIXING A DEVICE TO A WORKPIECE

[76] Inventors: Thomas W. Richardson; Mary Jane Richardson, both of 934 Cleveland Rd., Hinsdale, Ill. 60521

[21] Appl. No.: 942,584

[22] Filed: Sep. 9, 1992

[51] Int. Cl.[5] .................. B23P 11/00

[52] U.S. Cl. .................. 227/110; 227/155; 29/243.51

[58] Field of Search .................. 227/110, 111, 155, 107; 29/243.51, 243.5; 411/458, 483, 491, 496, 498; 81/44

[56] References Cited

U.S. PATENT DOCUMENTS

| | | | |
|---|---|---|---|
| 180,181 | 7/1876 | Wineman | 411/491 |
| 1,029,574 | 6/1912 | Bell | 411/496 |
| 2,908,008 | 10/1959 | Potter | 29/243.51 |
| 3,261,085 | 7/1966 | Hobson | 29/243.51 |
| 3,581,350 | 6/1971 | McComb | 24/33 |
| 3,871,227 | 3/1975 | Tidwell, Jr. | 227/155 X |
| 3,900,144 | 8/1975 | Hamilton | 227/155 |
| 4,111,080 | 9/1978 | Pray | 29/243.51 |
| 4,333,217 | 6/1982 | Pray | 29/243.51 |
| 4,538,755 | 9/1985 | Schick | 29/243.51 X |

*Primary Examiner*—Rinaldi I. Rada
*Attorney, Agent, or Firm*—Foley & Lardner

[57] ABSTRACT

A system for affixing a device to a workpiece comprises a dynamic fastener applicator for imparting motion to a fastener with respect to the workpiece by urging the fastener along a path so that the fastener piercingly encounters the workpiece and fixedly engages the device with the workpiece. The system includes a static fastener applicator for effecting clasping engagement of the workpiece and the device by the fastener by a deflecting structure located in the path traveled by the driven fastener which orients the fastener to a clasping configuration for establishing the desired clasping engagement. The system further comprises a positioning apparatus for precisely establishing desired relative positions of the workpiece, the dynamic fastener applicator, the static fastener applicator, and the device for the desired clasping engagement. The positioning apparatus includes a plurality of pins and a plurality of pin-positioning structures which cooperate to laterally situate the dynamic fastener applicator, the device, and the deflecting structure for appropriately effecting the desired clasping engagement.

13 Claims, 3 Drawing Sheets

SYSTEM FOR AFFIXING A DEVICE TO A WORKPIECE

BACKGROUND OF THE INVENTION

The present invention is directed to a system for affixing a device to a workpiece, and is especially useful in effecting clinching fastener affixation, such as stapling, of a device to the end of a flexible belt for facilitating configuration of the belt as an endless belt.

Flexible endless belts connected with flexible steel fastening devices at the ends have been known for some time. In such products, there has long been and continues to be a need for a strong, reliable, flexible belt splice for splicing the two ends of the belt together to form an endless belt.

Belting fabrics and polymers have been improved over the years in terms of strength, stability, and reliability, but the staple fastenable belt splice device and its associated staple fastener tooling have not kept pace with the advances in belting fabrics and polymers. Basic problems with staples and their associated staple fastener tooling remain: staples are inconsistent in their clinching, staples experience a broken bridge or central portion intermediate their respective legs during installation, and staples are deflected off-line or out of their intended position.

Such problems require solutions in three major areas: staple design, staple driving device design, and design of a staple anvil to receive the staple and clinch it properly about a workpiece.

Generally available commercial staples used on belt splices are of two basic designs: a round wire design with rounded points and a flat wire design with chisel points.

It is desirable to have a system for establishing clinching affixation which is efficient for commercial production, will not provide a cutting edge on the belting or other workpiece to which the associated fastener is applied, will establish a fastening with sufficient strength to hold the respective fastener clinched to the workpiece under tension, and will be easy to operate. Thus, the staple design, the staple driving device, and the device to receive and deflect the staple to accomplish clinching should all be considered simultaneously.

SUMMARY OF THE INVENTION

The present invention is a system for affixing a device to a workpiece. The system comprises a dynamic fastener applicator for imparting motion to a fastener with respect to the workpiece by urging the fastener along a path so that the fastener piercingly encounters the workpiece and fixedly engages the device with the workpiece, and a static fastener applicator such as a fastener anvil for effecting clasping engagement of the workpiece and the device by the fastener. The static fastener applicator presents a deflecting structure in the path traveled by the driven fastener which orients the fastener to a clasping configuration for establishing the desired clasping engagement. The invention further comprises a positioning apparatus for precisely establishing desired relative positions of the workpiece, the dynamic fastener applicator, the static fastener applicator, and the device for the desired clasping engagement. The positioning apparatus includes a plurality of pins and a plurality of pin-positioning structures which cooperate to laterally situate the dynamic fastener applicator, the device, and the deflecting structure for appropriately effecting the desired clasping engagement. Proper alignment of the deflecting structure and driven fasteners, such as staples, reduces impact forces on staples, and thus reduces broken bridge portions of installed staples.

It is therefore an object of the present invention to provide a system for affixing a device to a workpiece which consistently effects clinching engagement of a fastener with the workpiece and the device.

A further object of the present invention is to provide a system for affixing a device to a workpiece which provides appropriate alignment of a fastening driver and a fastening anvil for effecting a desired clinching engagement between the device and a workpiece.

Yet a further object of the present invention is to provide a system for affixing a device to a workpiece which is easy and efficient in its operation.

Further objects and features of the present invention will be apparent from the following specification and claims when considered in connection with the accompanying drawings illustrating the preferred embodiment of the invention.

DETAILED DESCRIPTION OF THE DRAWINGS

DETAILED DESCRIPTION OF THE INVENTION

Figure 1:
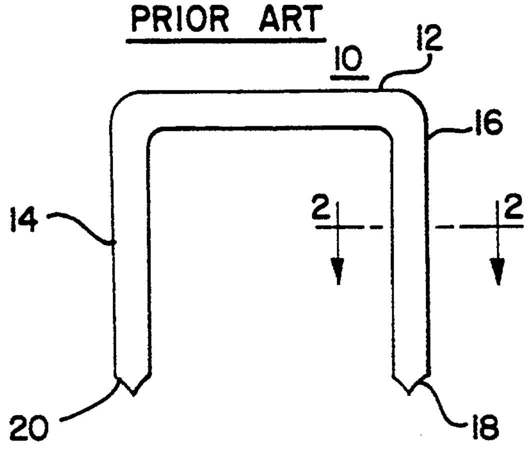
FIG. 1 PRIOR ART
FIG. 1 is a plan view of a round staple with a round point.

FIG. 1 is a plan view of a round staple with a round point. In FIG. 1, a round wire staple 10 is illustrated comprising a bight 12 connecting a first leg 14 and a second leg 16.

Figure 2:
FIG. 2 PRIOR ART
FIG. 2 is a section view of FIG. 1 taken along section 2—2 of FIG. 1.

FIG. 2 is a section view of FIG. 1 taken along section 2—2 of FIG. 1. In FIG. 2, leg 16 is illustrated as being round in cross section and, referring to FIG. 1, terminates in a round point 18. Leg 14 terminates in a round point 20. A round point minimizes cutting of a workpiece during installation, but a round point is expensive to manufacture and therefore is not a commercially feasible alternative.

Figure 3:
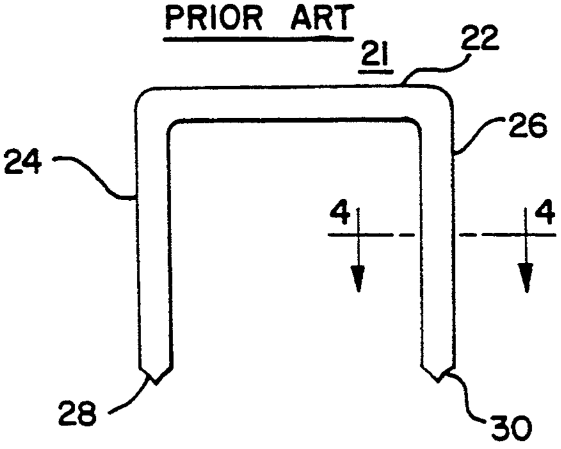
FIG. 3 PRIOR ART
FIG. 3 is a plan view of a flat staple with chisel points.

FIG. 3 is a plan view of a flat staple with chisel points. In FIG. 3, a flat wire staple 21 is illustrated comprising a bight section 22 interconnecting a first leg 24 and a second leg 26. First leg 24 and second leg 26 terminate in chisel points 28, 30.

Figure 4:
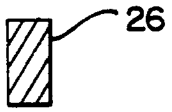
FIG. 4 PRIOR ART
FIG. 4 is a section view of the staple of FIG. 3 taken along section 4—4 of FIG. 3.

FIG. 4 is a section view of the staple of FIG. 3 taken along section 4—4 of FIG. 3. In FIG. 4, second leg 26 of flat wire staple 21 is illustrated as being generally rectangular in cross section. A flat wire staple with chisel points such as staple 21 is cheaper to produce than a round wire staple with rounded points, but such a flat wire staple acts much as a knife and cuts a belt when the belt is subjected to operating tension.

Figure 5:
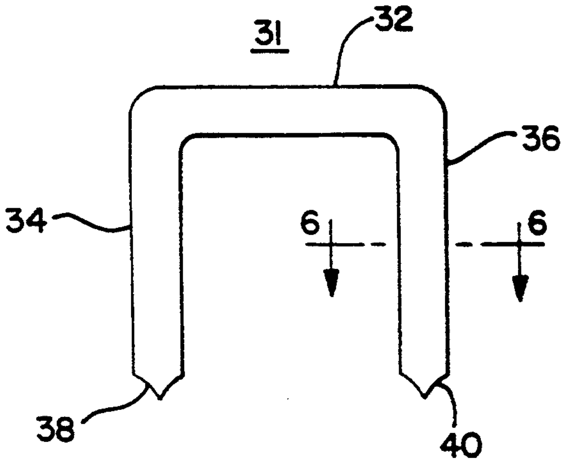
FIG. 5 is a plan view of an oval staple with a chisel point.

FIG. 5 is a plan view of an oval staple with a chisel point. In FIG. 5, oval wire staple 31 is illustrated comprising a bight section 32 intermediate a first leg 34 and a second leg 36. Legs 34, 36 terminate in chisel points 38, 40.

Figure 6:
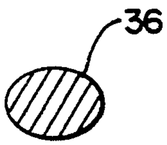
FIG. 6 is a section view of the staple of FIG. 5 taken along line 6—6 of FIG. 5.

FIG. 6 is a section view of the staple of FIG. 5 taken along line 6—6 of FIG. 5. In FIG. 6, leg 36 is illustrated as being oval in cross section. The inventor has discovered that an oval wire with rounded edges provides an optimum staple. Its oval cross section provides greater strength than a round wire cross section, and the smooth edges of the oval wire do not act as cutting edges with the belt under tension as is the case with flat wire staples.

The point of the staple is also extremely important. Various designs are available: round, slash, blunt, and chisel. A blunt point acts as a punch, cuts the fabric of the belt fabric to which it is applied and weakens the belt.

Slash points and chisel points penetrate a workpiece without destroying the belt fabric. Each of those points are easily made and collated for dispensing on a staple driver. However, a slash point does not generally drive straight. As a staple is driven through a belt or other workpiece, it meets resistance and as the staple point reaches the device intended to clinch the staple (i.e., the anvil), it meets further resistance. The shape of the slash point causes the staple to experience unequal resistance on two opposing sides during driving, thus causing the staple to travel off-line. Such off-line travel can cause the staple to contact the belt splice device or to improperly contact the anvil, thus resulting in improper clinching by the staple.

A chisel point staple, having a 45° central angle with equal legs on each side of the point, has been found to drive straight through belt fabric without deflecting since equal resistance by the belt is encountered on both sides of each point. Further, the 45° angle separates the belt material as it penetrates so that minimal cutting or destruction of the fabric results. Still further, as the 45° angle meets the angle of the device used to clinch or bend the staple (i.e., the staple anvil), the staple bends in the desired clinch configuration more reliably and more repeatably.

Figure 7:
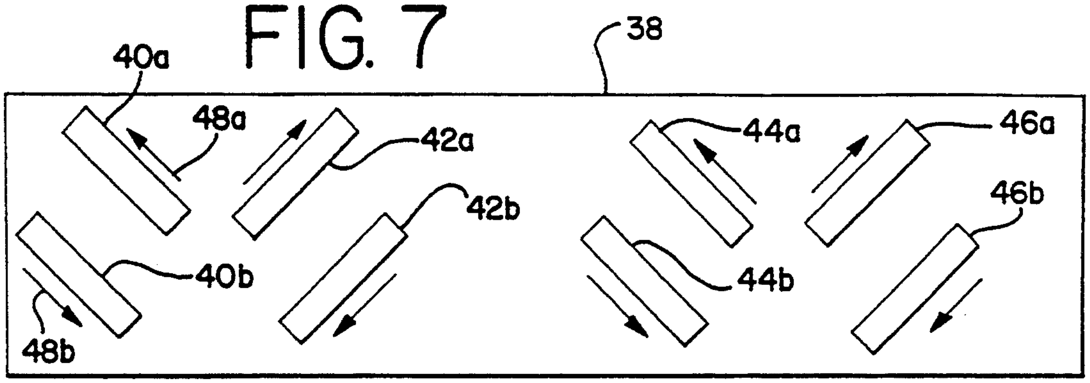
FIG. 7 is a plan view of an array of staple bending cavities in a fastener anvil.

FIG. 7 is a plan view of an array of staple bending cavities in a fastener anvil. In FIG. 7, a fastener anvil 38 presents a plurality of cavities arranged in pairs: 40*a*, 40*b*; 42*a*, 42*b*; 44*a*, 44*b*; 46*a*, 46*b*. Each respective pair of cavities (for example, cavities 40*a*, 40*b*) are configured to receive legs of a fastener, such as a staple, and to direct those received legs in opposing directions substantially parallel in orientation. That is, cavity 40*a* and cavity 40*b* each receives a leg of a staple; cavity 40*a* directs the staple leg received therein in the direction indicated by arrow 48*a* and cavity 40*b* directs the leg of the staple received therein in the direction indicated by the arrow 48*b*.

A longer leg on a staple is easier to bend than a shorter leg to achieve the desired clinching relationship about a workpiece. However, there is difficulty in having too long a leg on a staple if the legs overlap each other when bent in the desired clinching orientation. Such an overlapping orientation is not desirable in such applications as an endless conveyor belt since the overlapping staples interfere with smooth travel of the splice over rollers or other guides in a conveyor system. Thus, it is desirable that the staple anvil provides cavities for reorienting, or directing, driven staples appropriately to establish a proper bend angle while also providing that the two legs do not overlap. Such a result is established by providing that the bent staple legs bypass each other in generally parallel, oppositely directed arrangement.

Proper alignment of the staples with the staple anvil during application of the staples is important in order to effect such a desired clinching arrangement among the staples, the device to be attached to the workpiece (i.e., the splicing device), and the workpiece (i.e., the belting). It is important to precisely and repeatably locate the device to be attached to be belt (in the case of a continuous conveyor, the device is generally in the form of a fastener strip substantially traversing the end of the conveyor belt) with respect to the cavity in the staple anvil that will bend the legs of the staple, and to simultaneously precisely and repeatably locate the staple driver (and, hence, the path of travel of a driven staple), with respect to the staple anvil.

Figure 8:
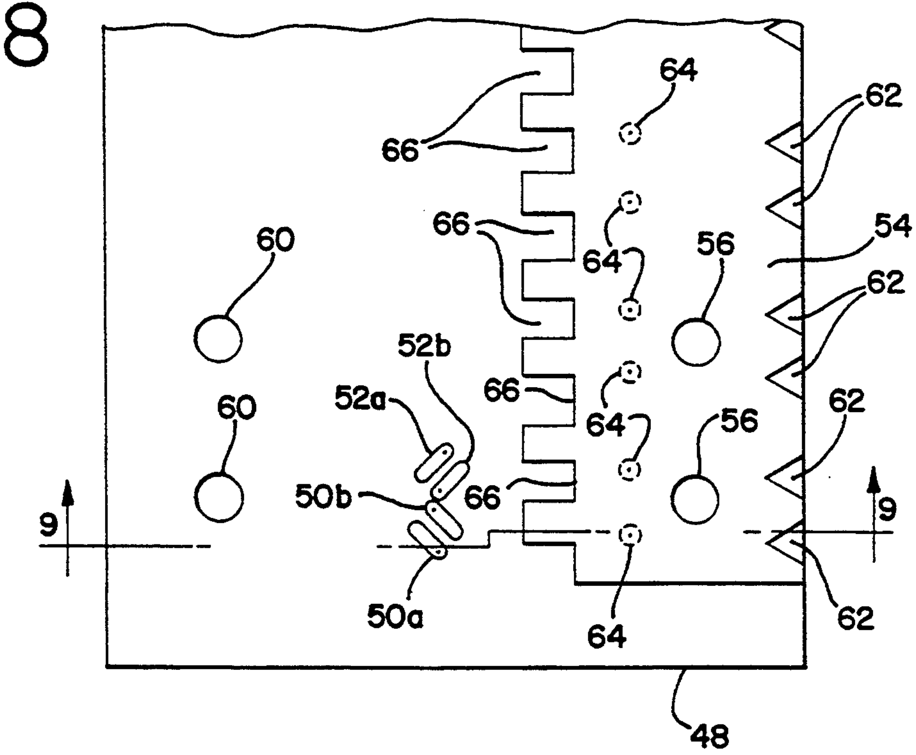
FIG. 8 is a plan view of the preferred embodiment of the template of the present invention associated with a staple anvil.

FIG. 8 is a plan view of the preferred embodiment of the template of the present invention associated with a staple anvil. In FIG. 8, a stapler anvil 48 is illustrated presenting a plurality of pairs of staple cavities 50*a*, 50*b*; 52*a*, 52*b*. A top plate or template 54 is affixed to a stapler anvil 48 via dowels or screws 56, 60.

Figure 9:
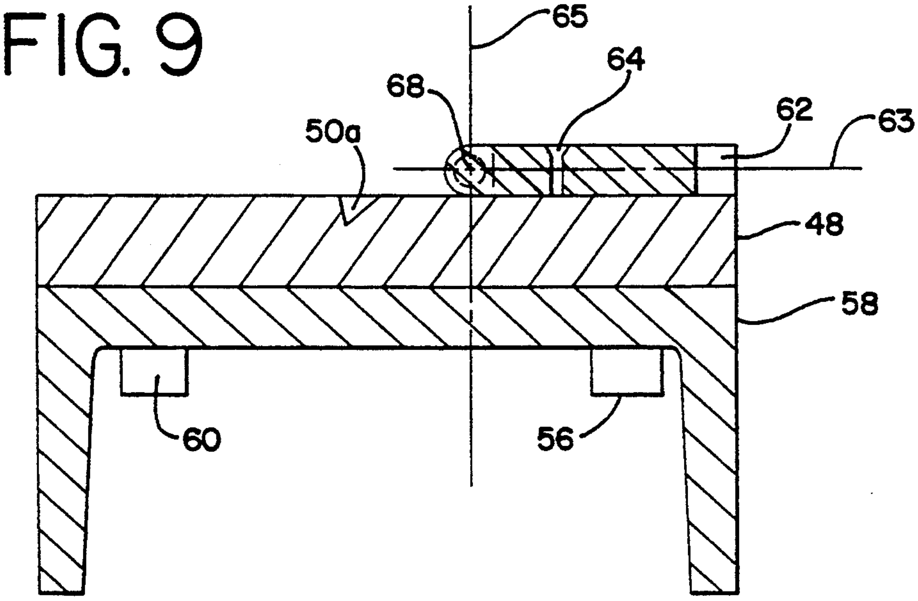
FIG. 9 is a side section view of the apparatus illustrated in FIG. 8 taken along line 9—9 of FIG. 8.

FIG. 9 is a side section view of the apparatus illustrated in FIG. 8 taken along line 9—9 of FIG. 8. In FIG. 9, stapler anvil 48 is seen as being affixed to a base or table 58 via dowels or screws 56, 60, which also affix template 54 to staple anvil 48. Template 54 presents preferably V-shaped guide slots 62 and alignment apertures 64 for aligning a staple applicator, as will be described hereinafter. Template 54 also presents fastener device accommodating slots 66 for aligningly engaging fasteners to be affixed to the end of a workpiece appropriately for installation on the workpiece via clinching fasteners, such as staples. The staples (not shown in FIGS. 8–9) are driven through the workpiece, through the fastener device, and into the stapler cavities, as will be described hereinafter. Referring to FIG. 9, it may be seen that an alignment aperture 68 is associated with fasteners device accommodating slots 66.

Figure 13:
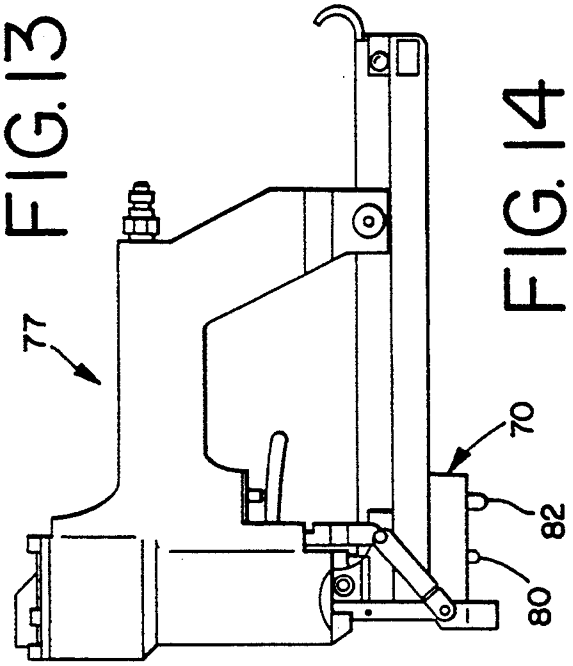
FIG. 13 is an illustration of a representative staple driver with the positioning apparatus of FIGS. 10–12 installed thereon.
Figure 10:
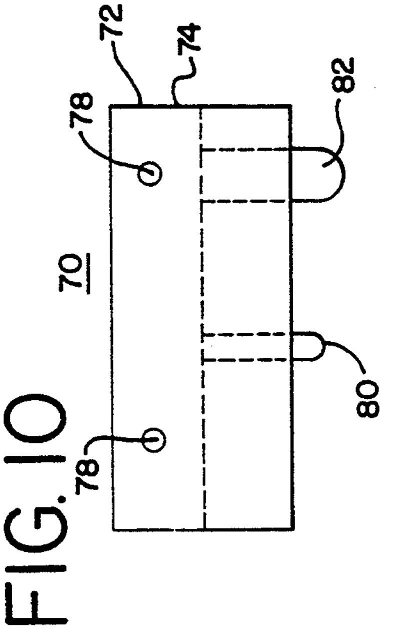
FIG. 10 is a side view of the preferred embodiment of a positioning apparatus for use with a staple driver.
Figure 11:
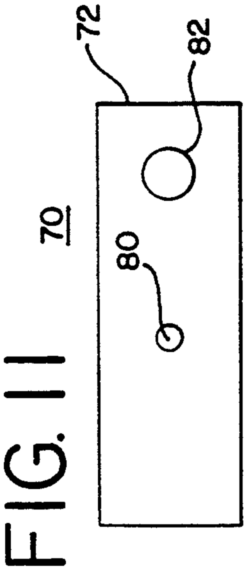
FIG. 11 is a bottom view of the positioning apparatus illustrated in FIG. 10.
Figure 12:
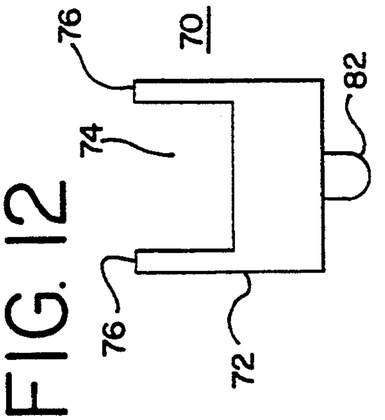
FIG. 12 is a side view of the positioning apparatus illustrated in FIG. 10.

FIG. 10 is a side view of the preferred embodiment of a positioning apparatus for use with a staple driver. FIG. 11 is a bottom view of the positioning apparatus illustrated in FIG. 10. FIG. 12 is a side view of the positioning apparatus illustrated in FIG. 10. FIG. 13 is an illustration of a representative staple driver with the positioning apparatus of FIGS. 10–12 installed thereon.

In FIGS. 10–13, a positioning apparatus 70 is illustrated comprising a generally U-shaped block 72 presenting a channel 74 bound by legs 76. Mounting holes 78 are presented in order that positioning apparatus 70 may be mounted to a stapling apparatus 77, as illustrated generally in FIG. 13. Guidance pins 80, 82 are presented by positioning apparatus 70 and project downward from positioning apparatus 70 when positioning apparatus 70 is installed on a stapling apparatus 77 as indicated generally in FIG. 13.

Thus, positioning stapling apparatus 77 for fastening a device, a workpiece, and a clinching fastener such as a staple, employing a stapler anvil 48 (FIG. 8) may be accomplished with the preferred embodiment of the present invention by positioning guidance pin 82 within a respective guide slot 62 along an engagement axis 63 (FIG. 9) and positioning guidance pin 80 in an associated alignment aperture 64 along an engagement axis 65 (FIG. 9) appropriately to align the thus laterally-positioned stapling apparatus 77 over appropriate staple cavities 50*a*, 50*b* in staple anvil 48 (see FIG. 8).

Figure 14:
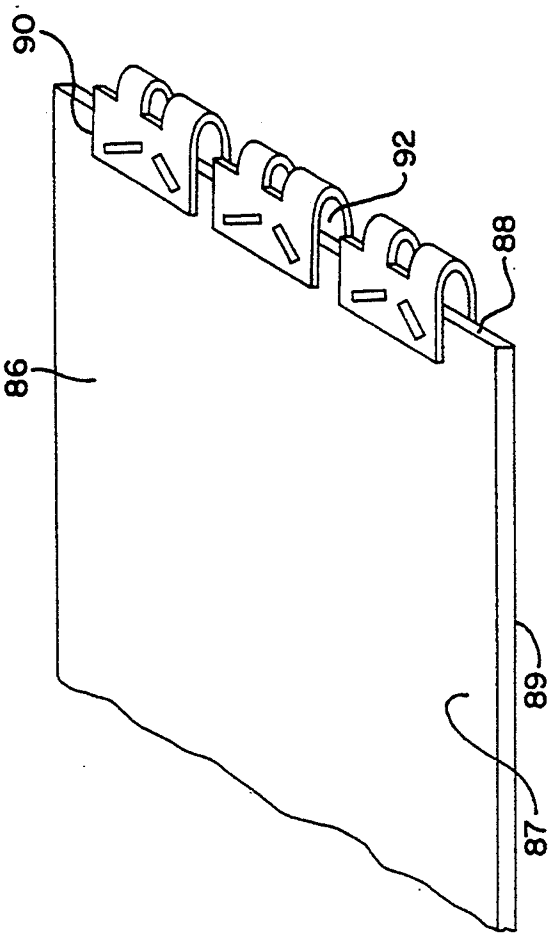
FIG. 14 is a perspective view of one end of a workpiece with fastener devices in place for creating an endless belt.

FIG. 14 is a perspective view of one end of a workpiece with fastener devices in place for creating an endless belt.

FIG. 14 illustrates the alignment of the various components associated with the fastening sought to be accomplished by the apparatus of the present invention. In FIG. 14, a workpiece, or belt, 86 has attached to an end 88 thereof a plurality of fasteners 90. Workpiece 86 has a top surface 87 and a bottom surface 89. Each fastener 90 presents a through-channel 92 which is oriented to nestingly receive complementary fasteners (not shown) on the other end of the same workpiece 86 so that passing a retaining pin (not shown) through complementary-aligned through-channels 92 linkingly joins fasteners 90 at the two ends of workpiece 86, thereby forming a continuous belt. The alignment of fasteners 90 with respect to workpiece 86, and alignment of fasteners 90 with appropriate staple cavities 50*a*, 50*b* of stapler anvil 48 is effected by insertion of the respective fasteners 90 in fastener device accommodating slots 66 of template 54, alignment of through-channels 92 with alignment aperture 68 and insertion of a retaining pin (not shown) through alignment aperture 68 and the various thus-aligned through-channels 92 to laterally position fasteners 90 with respect to stapler anvil 48. Thus, alignment of the stapling apparatus 77 via interaction of guidance pins 80, 82 with an appropriate guide slot 62 and an appropriate alignment aperture 64 of template 54 serves to laterally align stapling apparatus 77 for driving staples through fasteners 90, through workpiece 86, and encountering stapler anvil 48 appropriately at staple cavities 50*a*, 50*b* for staple cavities 50*a*, 50*b* to each receive a leg of the driven staple and redirect the legs of such driven staples to establish a desired clinching engagement affixing a fastener 90 to workpiece 86.

It is to be understood that, while the detailed drawings and specific examples given describe a preferred embodiment of the invention, they are for the purpose of illustration only, that the apparatus of the invention is not limited to the precise details and conditions disclosed and that various changes may be made therein without departing from the spirit of the invention which is defined by the following claims.

We claim:

1. A system for affixing a device to a workpiece; the system comprising:

a dynamic fastening means for imparting motion to a fastener with respect to said workpiece; said dynamic fastening means containing said fastener and urging said fastener along a path for dispensing said fastener, said fastener when dispensed piercingly encountering said workpiece and fixedly engaging said device with said workpiece;

a static means for effecting clasping engagement of said workpiece and said device by said fastener; said static fastening means including deflecting means, said deflecting means, upon engagement with said fastener, orienting said fastener to a clasping configuration for establishment said clasping engagement; and a positioning means for establishing desired relative positions of said workpiece, said dynamic fastening means and said fastener, said device, and said deflecting means for said clasping engagement; said positioning means including a plurality of pins and a plurality of pin-positioning structures; said plurality of pins including a first set pin and a second pin; said plurality of pin-positioning structures including a first pin-positioning structure for engaging said first pin and a second pin-positioning structure for engaging said second pin; said fastener being placed in alignment with said device and said deflecting means for engaging said deflecting means when said first and second pins engage said first and second pin-positioning structures respectively to cause said deflecting means, upon engagement with said fastener, to orient said fastener to said clasping configuration for establishing said clasping engagement.

2. A system for affixing a device to a workpiece as recited in claim 1 wherein said first pin-positioning structure comprises a plurality of adjacent notches arranged in a generally linear array, each said notch of said plurality of notches being proportioned to substantially horizontally nestingly receive said first pin; said second pin-positioning structure comprises a plurality of depressions, said plurality of depressions being generally linearly arrayed and proportioned to nestingly receive said second pin, selected depressions of said plurality of depressions being appropriately aligned with selected notches of said plurality of notches to align said fastener on said path with said deflecting means when said first pin is nestingly received by said first pin-positioning structure and when said second pin is nestingly received by said second pin-positioning structure.

3. A system for affixing a device to a workpiece as recited in claim 1 wherein said fastener comprises a staple having a bight and a pair of legs extending therefrom, each leg of said pair of legs having an elliptical cross section.

4. A system for affixing a device to a workpiece as recited in claim 3 wherein each leg of said pair of legs terminates with a chisel point, said chisel point coacting with said deflecting means for establishing said clasping engagement.

5. An apparatus for establishing desired relative positions of a fastener anvil and a fastener driven in a fastening position by a fastener driver, said fastener driver driving a fastener through a workpiece against said fastener anvil, said fastener anvil orienting said fastener in a clinching engagement with said workpiece when said fastener driver, said workpiece, and said fastener anvil are in said fastening position; the apparatus comprising:

a protruding guide means for aligning said fastener driver and said fastener anvil in said fastening position; and a receiver guide means for cooperating with said protruding guide means to effect said aligning;

said receiver guide means comprising a plurality of receptors, said protruding guide means comprising a plurality of protrusions;

said plurality of receptors being coupled with said fastener anvil;

said plurality of protrusions being coupled with said fastener driver;

at least two receptors of said plurality of receptors engaging at least two protrusions of said plurality of protrusions to align said fastener driver and said fastener anvil for effecting said clinching engagement.

6. An apparatus for establishing desired relative positions of a fastener anvil and a fastener driver in a fastening position as recited in claim 4 wherein said protruding guide means is fixedly coupled with said fastener driver.

7. An apparatus for establishing desired relative positions of a fastener anvil and a fastener driver in a fastening position as recited in claim 5 wherein said protruding guide means comprises a first pin and a second pin.

8. A system for affixing a device to a workpiece; the system comprising:

a fastener driver means for driving a fastener through said workpiece;

a fastener anvil means for orienting said fastener in a clinching engagement with said workpiece and said device when said fastener driver means drives said fastener from a specified driving position against said fastener anvil means;

a positioning means for establishing desired relative positions of said workpiece, said fastener driver means, said fastener anvil means, and said device to effect said clinching engagement, said positioning means including a plurality of pins and a plurality of pin-positioning structures; said plurality of pin-positioning structures and said plurality of pins cooperating to align said fastener driver means, said fastener anvil means, said workpiece and said device in said specified driving position, said plurality of pin-positioning structures comprising a first pin-positioning structure and a second pin-positioning structure; said first pin-positioning structure comprising a plurality of adjacent notches arranged in a generally linear array, each said notch of said plurality of notches being proportioned to substantially horizontally nestingly receive a first pin of said plurality of pins; said second pin-positioning structure comprising a plurality of depressions, said plurality of depressions being generally linearly arrayed and proportioned to nestingly receive a second pin of said plurality of pins, selected depressions of said plurality of depressions being appropriately aligned with selected notches of said plurality of notches to align said fastener with said fastener anvil means when said first pin is nestingly received by said first pin-positioning structure and when said second pin is nestingly received by said second pin-positioning structure.

9. A system for affixing a device to a workpiece; the system comprising:

a dynamic fastening means for imparting motion to a fastener with respect to said workpiece; said dynamic fastening means urging said fastener along a path, said fastener piercingly encountering said workpiece and fixedly engaging said device with said workpiece;

a static fastening means for effecting clasping engagement of said workpiece and said device by said fastener; said static fastening means including a deflecting means, said deflecting means orienting said fastener to a clasping configuration for establishing said clasping engagement; and a positioning means for establishing desired relative positions of said workpiece, said fastener, and said device for said clasping engagement; said positioning means including a plurality of pins coupled to one of said dynamic fastening means and said static fastening means and a plurality of pin-positioning structures coupled to the other of said dynamic fastening means and said static fastening means; said plurality of pin-positioning structures and said plurality of pins cooperating to laterally situate said fastener and said device with respect to said deflecting means for said clasping engagement;

said plurality of pin-positioning structure comprising a first pin-positioning structure and a second pin-positioning structure; said first pin-positioning structure comprising a plurality of adjacent notches arranged in a generally linear array, each said notch of said plurality of notches being proportioned to substantially horizontally nestingly receive a first pin of said plurality of pins; said second pin-positioning structure comprising a plurality of depressions, said plurality of depressions being generally linearly arrayed and proportioned to nestingly receive a second pin of said plurality of pins, selected depressions of said plurality of depressions being appropriately aligned with selected notches of said plurality of notches to align said fastener on said path with said deflecting means when said first pin is nestingly received by said first pin-positioning structure and when said second pin is nestingly received by said second pin-positioning structure.

10. A system for affixing a device to a workpiece; the system comprising:

a fastener driver means for driving a fastener through said workpiece;

a fastener anvil means for orienting said fastener in a clinching engagement with said workpiece and said device when said fastener driver means drives said fastener from a specified driving position against said fastener anvil means;

a positioning means for establishing desired relative positions of said workpiece, said fastener driver means, said fastener anvil means, and said device to effect said clinching engagement; said positioning means including a plurality of pins coupled to one of said fastener driver means or said fastener anvil means and a plurality of pin-positioning structures coupled to the other of said fastener driver means or said fastener anvil means; said plurality of pin-positioning structures and said plurality of pins cooperating to situate said fastener drive means, said fastener anvil means, and said workpiece to said device in said specified driving position;

said plurality of pin-positioning structure comprising a first pin-positioning structure and a second pin-positioning structure; said first pin-positioning structure comprising a plurality of adjacent notches arranged in a generally linear array, each said notch of said plurality of notches being proportioned to substantially horizontally nestingly receive a first pin of said plurality of pins; said second pin-positioning structure comprising a plurality of depressions, said plurality of depressions being generally linearly arrayed and proportioned to nestingly receive a second pin of said plurality of pins, selected depressions of said plurality of depressions being appropriately aligned with selected notches of said plurality of notches to align said fastener with said fastener anvil means when said first pin is nestingly received by said first pin-positioning structure and when said second pin is nestingly received by said second pin-positioning structure.

11. A system for affixing a device to a workpiece, said workpiece having a top surface and a bottom surface, the system comprising:

dynamic fastening means for imparting motion to a staple with respect to said workpiece, said staple having a bight and a pair of legs extending from said bight, said dynamic fastening means urging said staple along a path, said legs piercing said top surface and exiting said bottom surface of said workpiece and fixedly engaging said device with said workpiece;

static fastening means for effecting clasping engagement of said workpiece and said device by said staple, said static fastening means including a deflecting means, said deflecting means deflecting said legs toward said bottom surface of said workpiece to a clasping configuration for establishing said clasping engagement;

positioning means for establishing desired relative positions of said workpiece, said staple, said device and said deflecting means to facilitate said motion of said staple along said path and into engagement with said deflecting means, said positioning means including a plurality of pins coupled with said dynamic fastening means and a plurality of pin-positioning structures coupled with said static fastening means, said plurality of pins including a first pin and a second pin, said plurality of pin-positioning structures including a first pin-positioning structure for engaging said first pin and a second pin-positioning structure for engaging said second pin, said first and said second pins and said first and said second pin-positioning structures cooperating to align said staple and said device with said deflecting means to enable said legs to be moved into engagement with said deflecting means for deflecting said legs toward said bottom surface of said workpiece.

12. A system for affixing a device to a workpiece as recited in claim 11 wherein said first pin-positioning structure comprises a plurality of adjacent pin receptacles arranged in a generally linear array, each said pin receptacle of said plurality of pin receptacles being proportioned to nestingly receive a first pin of said plurality of pins, and said second pin-positioning structure comprises a plurality of depressions, said plurality of depressions being generally linearly arrayed and proportioned to nestingly receive a second pin of said plurality of pins, selected depressions of said plurality of depressions being appropriately aligned with selected pin receptacles of said plurality of pin receptacles to align said staple on said path with said deflecting means when said first pin is nestingly received by said first pin-positioning structure and when said second pin is nestingly received by said second pin-positioning structure.

13. A system for affixing a device to a workpiece as recited in claim 12 wherein each pin of said plurality of pins is coupled to said dynamic fastening means and wherein said plurality of pin receptacles and said plurality of depressions are formed in said static fastening means.

* * * * *